Jan. 10, 1950        E. C. HARTLEY        2,493,966
VALVE ASSEMBLY
Filed April 12, 1944        2 Sheets-Sheet 1
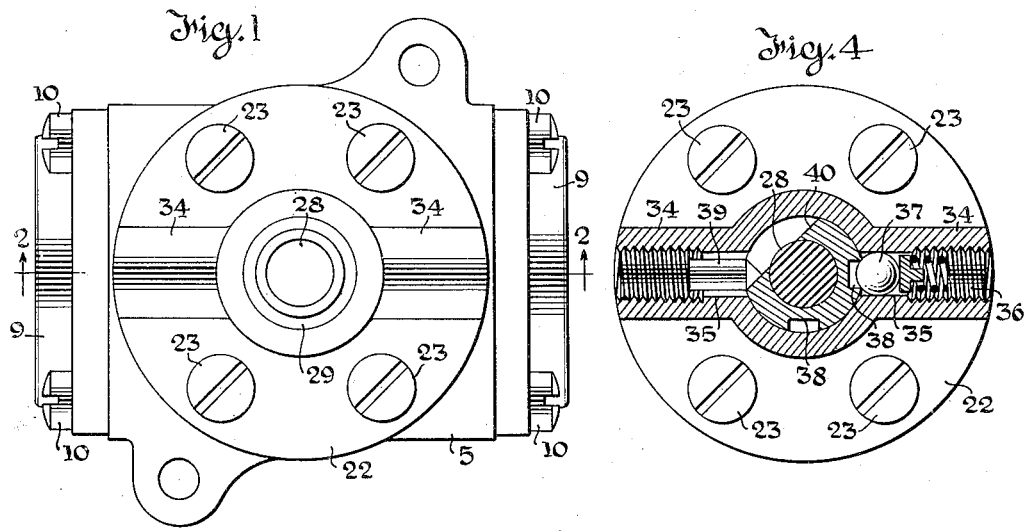
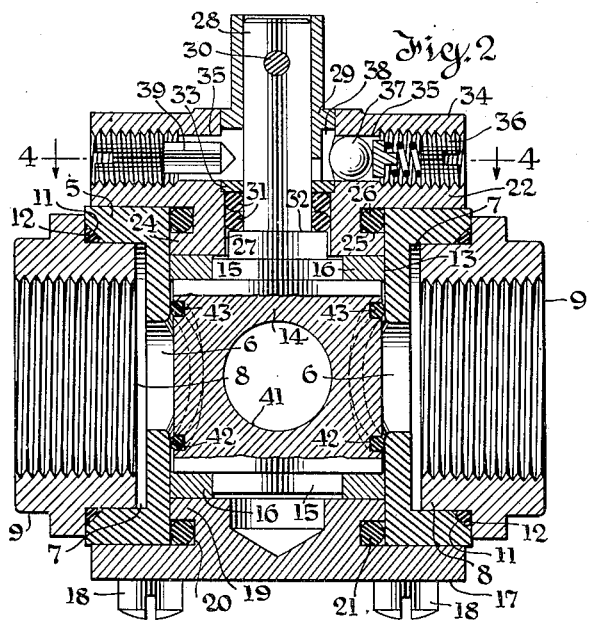
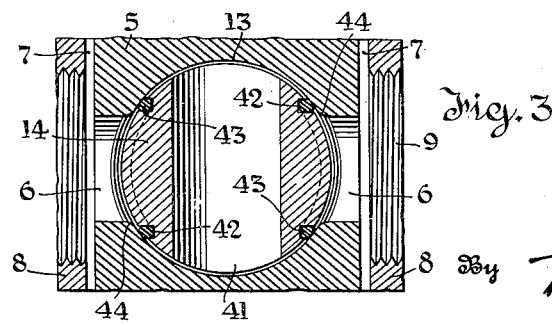
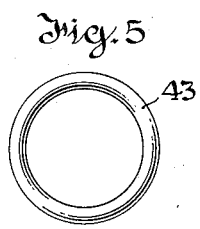
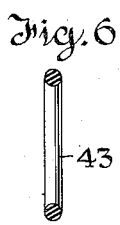
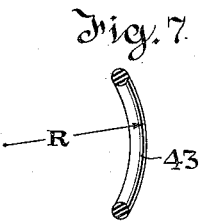
Inventor
Emmett C. Hartley
By Mason, Porter & Diller
Attorneys

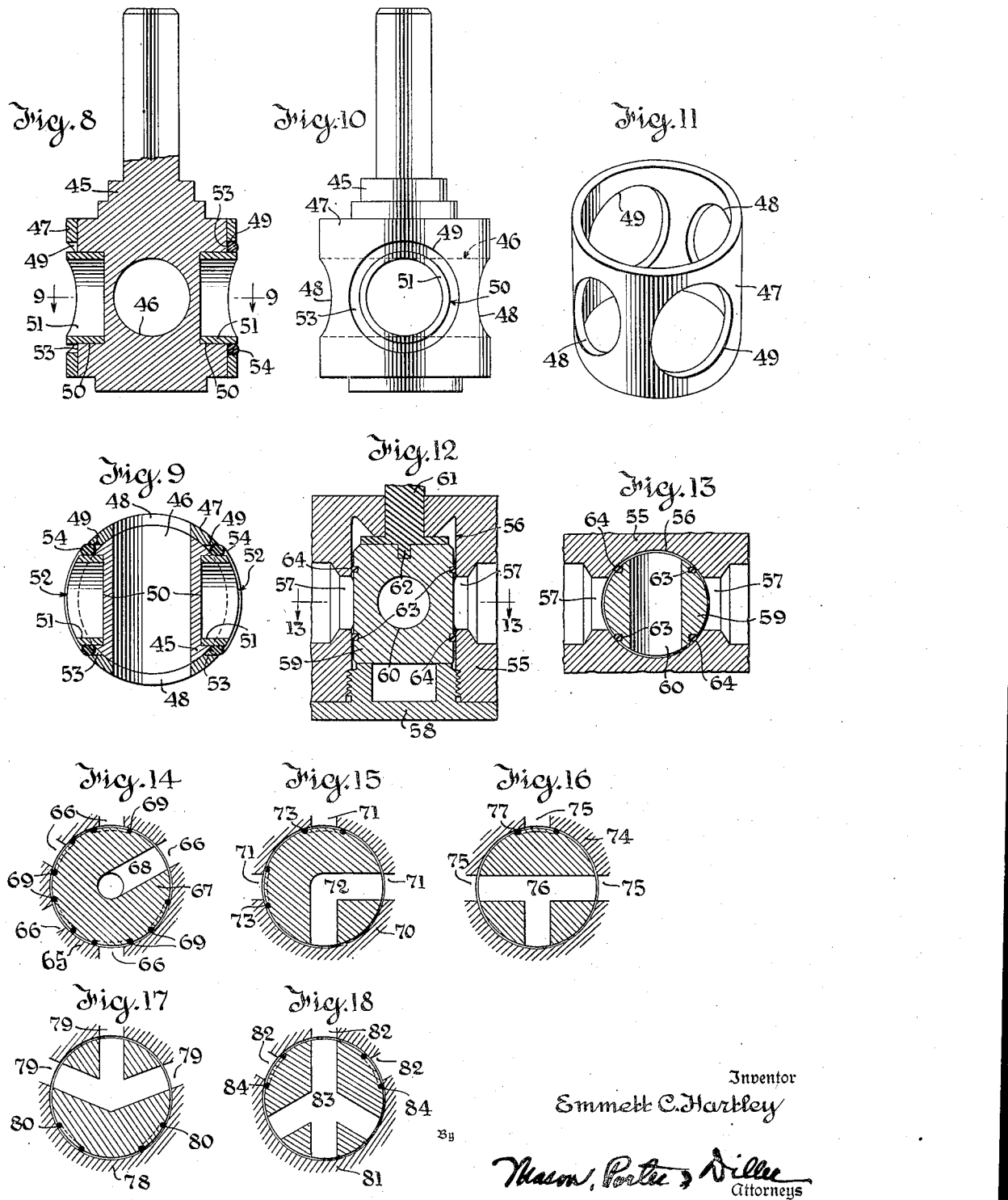

Patented Jan. 10, 1950

2,493,966

UNITED STATES PATENT OFFICE 2,493,966

VALVE ASSEMBLY

Emmett C. Hartley, Cleveland, Ohio, assignor to The Parker Appliance Company, Cleveland, Ohio, a corporation of Ohio Application April 12, 1944, Serial No. 530,619

2 Claims. (Cl. 251—103)

The invention relates generally to valves and primarily seeks to provide a novel valve structure embodying a casing, at least one inlet port, at least one outlet port, a rotor having a flow passage therethrough and turnable for permitting or preventing flow of fluid through said ports and passage, and sealing ring means associated with at least one said port and adapted for surrounding the same in sealing contact between the rotor and the casing for sealing off the surrounded port.

An object of the invention is to provide a valve structure in which there is provided at least one port sealing ring disposed in sealing contact between the casing member and the rotor member and adapted to surround and seal off a port as stated, and wherein the ring is mounted in a receiving groove in one of said members.

Another object of the invention is to provide a valve structure of the character stated in which the sealing ring is mounted in a receiving groove in the rotor.

Another object of the invention is to provide a valve structure of the character stated in which the sealing ring is mounted in a receiving groove in the rotor and is presentable in sealing position over a casing port when the rotor is turned a predetermined amount, and in which is included means for indicating when the rotor has been turned said predetermined amount and for yieldably holding the rotor at that position.

It is well known that a circular groove such as is herein contemplated as a mounting seat for a sealing ring can be formed in a cylindriform surface through the medium of a cutting operation only with great difficulty because of the necessity of imparting simultaneous relative rotation and movement toward and from each other of the surface being grooved and the grooving tool. Therefore, the present invention seeks to provide novel means for forming sealing ring mounting grooves in cylindriform surfaces without the necessity of utilizing a groove forming cutting tool.

Another object of the invention is to provide a valve structure of the character stated in which there is included novel means for forming the sealing ring mounting groove in the rotor, said means comprising a sleeve mounted over the periphery of the rotor and having a bore therethrough forming the outer wall of the groove, and a sleeve inserted in and projecting radially from a bore in the rotor and disposed concentrically within the sleeve bore and shaped at its projected end so as to conform to the curvature of the rotor and form the inner wall of said groove.

With the above and other objects in view that will hereinafter appear, the nature of the invention will be more clearly understood by reference to the following detailed description, the appended claims, and the several views illustrated in the accompanying drawings.

In the drawings:

Figure 1 is a plan view illustrating a valve structure embodying the invention.

Figure 2 is a vertical, longitudinal sectional view taken on the line 2—2 on Figure 1.

Figure 3 is a fragmentary horizontal, longitudinal section taken through the axis of the flow passage through the valve structure of Figure 2, the valve rotor as in Figure 2, being turned to the valve closed position.

Figure 4 is a horizontal sectional view taken on the line 4—4 on Figure 2.

Figure 5 is a face view of one of the port sealing rings.

Figure 6 is a vertical cross sectional view of the ring illustrated in Figure 5.

Figure 7 is a view similar to Figure 6, the ring being shown in the curved position which it assumes when in operative position in the valve structure.

Figure 8 is a vertical cross sectional view illustrating a valve rotor in which the sealing ring receiving grooves are formed in a novel manner.

Figure 9 is a horizontal sectional view taken through the axis of the flow passage in the rotor illustrated in Figure 8.

Figure 10 is a side elevation illustrating the rotor shown in Figure 8.

Figure 11 is a detail perspective view illustrating the rotor embracing sleeve which constitutes a part of the sealing ring groove forming equipment.

Figure 12 is a fragmentary vertical, longitudinal section of another form of valve structure embodying the invention.

Figure 13 is a fragmentary horizontal section taken on the line 13—13 on Figure 12.

Figures 14 through 18 are somewhat diagrammatic horizontal sectional views illustrating various forms of valve assemblies embodying the invention. In the example of embodiment of the invention herein disclosed in detail, the invention is illustrated as embodied in a two-way, on-off valve structure, but it is to be understood that the improved sealing features are subject to incorporation in valves having a greater number of ports and sealing rings, different flow passage and port arrangements, and other variations in structural detail.

In the form of the invention illustrated in

Figures 1 through 7 there is included a casing 5 having a small longitudinal bore or flow passage therethrough providing a port 6 at each end of the casing and opening into a counterbore 7. Each counterbore receives the boss or end extension 8 of an internally threaded port adapter 9 which is secured by screws 10 to the casing. The end of each counterbore is chamfered as at 11 to form a seat for a packing rim 12 which surrounds the boss 8 of the respective cap and is tightly pressed against the respective seat by the cap.

The casing is provided with a large rotor bore 13 disposed to centrally traverse the bore 6 in the casing. The rotor bore 13 receives a cylindriform rotor 14, the external wall of which is spaced slightly within the bore, and the rotor is equipped with reduced diameter hubs 15 which have rotary bearing in non-metallic bearing rings 16 mounted in the casing in the manner clearly illustrated in Figure 2. It will be observed that the ends of the main rotor body also engage the bearing rings 16.

One end of the casing bore 13 is closed by a cap 17 which is secured to the casing by screws 18 and includes a boss 19 which engages in the respective end of the bore 13 and is equipped with a peripheral groove 20 for receiving a packing ring 21.

The other end of the bore 13 is closed by a cap 22 which is secured to the casing by screws 23 and includes a boss 24 which engages in the bore 13 and is equipped with a peripheral groove 25 in which is mounted a packing ring 26. The cap 22 is provided with a central bore 27 through which the reduced diameter rotor stem 28 projects. A collar 29 is pin secured as at 30 to the stem 28, and the stem is surrounded by packing rings 31 which surround the same between the stem shoulder 32 and a retaining ring 33 which is mounted beneath the collar 29.

The cap 22 is equipped with an upstanding rib 34 which has a bore 35 extending therethrough. Within one end of the bore 35 is threadably mounted a closure plug 36 and a spring pressed ball or detent 37 which is yieldably engageable with one or the other of the two recesses 38 formed in the collar 29 and spaced ninety degrees apart in the manner clearly illustrated in Figure 4. At its other end the bore 35 carries a threadably mounted stop screw 39 which is engageable with the side clearance or stop face portion 40 of the collar for definitely stopping movement of the valve rotor at the on and off positions at which the rotor is yieldably retained by the recess and detent equipment 38—37.

A flow passage 41 is provided in the rotor 14, and at two diametrically opposite points each spaced ninety degrees from one of the ends of the flow passage 41 the rotor is provided with a circular groove 42 in the external surface thereof. See Figures 2 and 3. It will be observed that each groove 42 is slightly larger in diameter than the casing port 6 with which it is adapted to cooperate. A sealing ring 43 of rubber or equivalent yieldable material is mounted in each groove 42 and projects therefrom in position for engaging in sealing contact with the walls of the casing bore 13. One of the rings 43 is shown in detail in Figures 5 and 6 of the drawings, and in Figure 7 one of the rings is illustrated in the position it assumes when effectively mounted in the respective rotor groove 42. When so mounted the radius R of the ring 43 will be slightly greater than the radius of the external surface of the rotor so that the ring will project from the groove and engage in sealing contact with the casing in the manner stated.

It will be obvious by reference to Figures 2 and 3 of the drawings that when the rotor is turned to align the flow passage 41 thereof with the casing ports 6, free pasage of fluid through the valve will be permitted, but when the rotor is turned a quarter turn so as to place the flow passage 41 of the rotor in the position illustrated in Figures 2 and 3, the sealing rings 43 will be placed so as to surround the casing ports 6 and effectively seal them off. In order to assure against pinching of the sealing rings 43 as the valve rotor is moved, the inner edges of the ports 6 are well rounded as at 44.

In the form of the invention illustrated in Figures 8 through 11, there is disclosed novel means for forming the sealing ring receiving grooves in the rotor by means other than by cutting the grooves in the external surface of the rotor. In these figures the rotor is generally designated 45 and includes a flow passage 46 positioned as in the previously described valve structure. A sleeve 47 is press fitted over the periphery of the rotor and has apertures 48 formed therein in registry with the flow passage 46. It is preferred that the sleeve be press fitted onto the rotor prior to the formation of the flow passage 46 and the sleeve holes 48 so that these openings will perfectly register. The sleeve 47 is also provided with registering holes 49 which are diametrically oppositely disposed and are centered between the sleeve holes 48. The rotor is provided with a bore 50 disposed concentrically within each of the sleeve holes 49, and in each bore 50 is mounted a sleeve 51. Each sleeve 51 is of a length for extending radially beyond the periphery of the rotor, and the extended end of each sleeve is cut off and rounded so as to conform to the curvature and diameter of the external surface of the sleeve 47 in the manner clearly illustrated in Figure 9. It will be obvious by reference to Figures 8, 9 and 10 of the drawings that the outer surface of that portion of each sleeve 51 projecting beyond the periphery of the rotor, and the adjacent inner wall of the sleeve hole 48 cooperate with the periphery of the rotor in forming a sealing ring receiving groove. A sealing ring 54 of rubber or equivalent yieldable material is mounted in each groove thus formed and projects slightly therefrom in the manner hereinbefore described so as to be engageable in efficient sealing contact with the opposing casing bore wall.

In Figures 12 and 13 of the drawing there is illustrated another form of the invention in which the casing 55 is equipped with a rotor receiving bore 56 and flow ports 57. One end of the casing bore is closed by a threadably mounted cap 58, and a rotor 59 is rotatably mounted in the casing bore and is equipped with a flow passage 60 for cooperating with the casing ports 57. An actuator stem 61 is detachably connected as at 62 to the rotor. The rotor is equipped with surface grooves 63 for receiving sealing rings 64, and it will be noted that the grooves are dimensioned and placed in the same general arrangement illustrated in Figures 1 to 3 so that the rings may be presented in the manner illustrated in Figures 12 and 13 for effectively sealing off the casing ports 57.

In Figure 14 there is diagrammatically illustrated a form of valve in which the casing 65 is equipped with a multiple of equi-distantly spaced ports 66, and the rotor 67 is equipped with an elbow flow passage 68 effective upon turning of the rotor to selectively communicate between any selected one of the multiple of casing inlet or outlet ports and a single passage discharge or inlet port. The rotor 67 is equipped with groove mounted sealing rings 69 which are positioned so as to be placeable over all of the casing ports 66 except the one with which the elbow flow passage is in register.

In Figure 15 there is diagrammatically illustrated a form of valve in which the casing 70 has three inlet or outlet ports 71, and the rotor 72 has an elbow flow passage effective to selectively connect ports 71. Groove mounted sealing rings 73 are provided in the rotor and are positioned so that they can be placed over two non-selected casing ports in the manner illustrated in Figure 15.

In Figure 16 there is diagrammatically illustrated a form of valve structure in which the casing 74 has three ports 75, and the rotor 76 has a three-way T passage, the legs of which are simultaneously registrable with the three ports or any two or none thereof. This rotor is provided with a single groove mounted ring which is positioned so that it can be placed over one of the non-selected ports opposite the upright of the T passage in the rotor.

In Figure 17 there is diagrammatically illustrated a valve structure in which the casing 78 is equipped with three ports and the rotor is equipped with a modified three-way or T passage, the legs of which are simultaneously registrable with the three ports or any two or none thereof. This rotor is equipped with two groove mounted rings 80 which are placeable over two non-selected ports 79.

In Figure 18 is diagrammatically illustrated still another form of valve structure in which the casing 81 is equipped with three ports 82, and the rotor is equipped with crowfoot passages 83 selectively registrable with the ports. This rotor is equipped with two groove mounted sealing rings 84 which are placeable over two non-selected casing ports in the manner illustrated in Figure 18.

While one form of the invention has been shown for purposes of illustration, it is to be clearly understood that various changes in the details of the construction and arrangement of parts may be made without departing from the spirit and scope of the invention as defined in the appended claims.

I claim:

1. A valve rotor comprising a generally cylindriform rotor body having a flow passage therein, a sleeve surrounding the rotor and having a hole therein, said rotor having a bore therein arranged concentrically within the sleeve hole, and a sleeve mounted in and projecting from said bore and having its extended end shaped to conform to the curvature of the outside surface of the sleeve whereby the outside face of the extended portion of the bore mounted sleeve, the inner wall of the hole in the rotor surrounding sleeve and the periphery of the rotor between said face and wall cooperate in forming a sealing ring receiving groove.

2. A valve rotor comprising a generally cylindriform rotor body having a flow passage therein, a sleeve surrounding the rotor and having a hole therein, said rotor having a bore therein arranged concentrically within the sleeve hole, and a sleeve mounted in and projecting from said bore and having its extended end shaped to conform to the curvature of the outside surface of the sleeve whereby the outside face of the extended portion of the bore mounted sleeve, the inner wall of the hole in the rotor surrounding sleeve and the periphery of the rotor between said face and wall cooperate in forming a sealing ring receiving groove, and a sealing ring of yieldable material mounted in and projecting slightly from said groove.

EMMETT C. HARTLEY.

REFERENCES CITED

The following references are of record in the file of this patent:

UNITED STATES PATENTS

| Number | Name | Date |
|---|---|---|
| 862,143 | Duffy | Aug. 6, 1907 |
| 1,872,417 | Dalldorf | Aug. 16, 1932 |
| 1,999,496 | Adams | Apr. 30, 1935 |
| 2,114,789 | Urquhart | Apr. 19, 1938 |
| 2,233,840 | Koehler | Mar. 4, 1941 |
| 2,290,349 | Ohls | July 21, 1942 |
| 2,310,583 | Johnson | Feb. 9, 1943 |
| 2,433,732 | Brown | Dec. 30, 1947 |

FOREIGN PATENTS

| Number | Country | Date |
|---|---|---|
| 710,360 | France | June 8, 1931 |